J. E. GLEASON & A. L. STEWART.
CUTTER FOR GEARS.
APPLICATION FILED SEPT. 15, 1916.

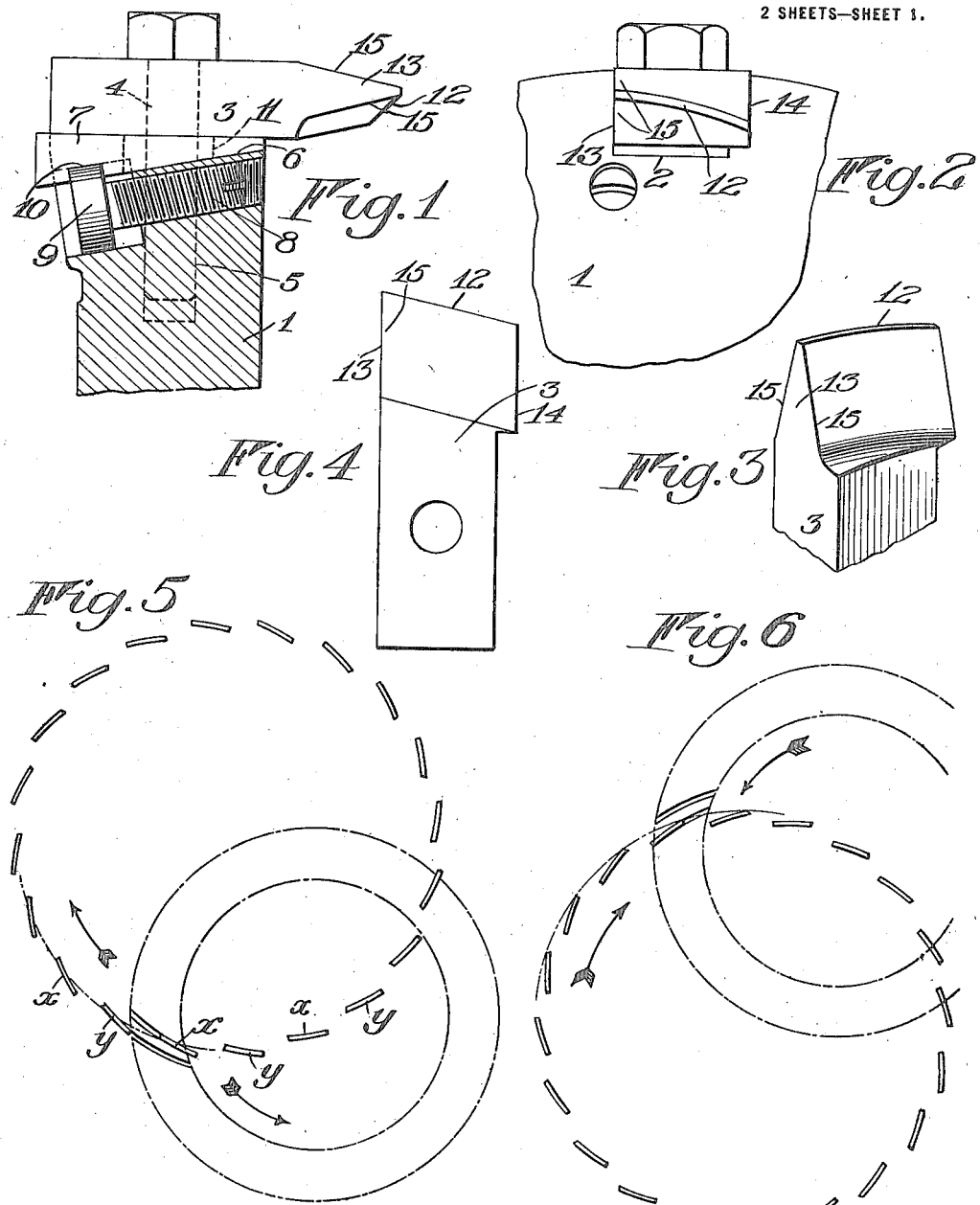

1,249,378.

Patented Dec. 11, 1917.
2 SHEETS—SHEET 2.

WITNESS
Walter B. Payne

INVENTORS
James E. Gleason
Arthur L. Stewart
BY
their ATTORNEYS

UNITED STATES PATENT OFFICE.

JAMES E. GLEASON AND ARTHUR L. STEWART, OF ROCHESTER, NEW YORK, ASSIGNORS TO GLEASON WORKS, OF ROCHESTER, NEW YORK, A CORPORATION OF NEW YORK.

CUTTER FOR GEARS.

1,249,378.  Specification of Letters Patent.  Patented Dec. 11, 1917.

Original application filed December 26, 1914, Serial No. 879,026. Divided and this application filed September 15, 1916. Serial No. 120,237.

*To all whom it may concern:*

Be it known that we, JAMES E. GLEASON and ARTHUR L. STEWART, both of Rochester, in the county of Monroe and State of New York, have invented certain new and useful Improvements in Cutters for Gears; and we do hereby declare the following to be a full, clear, and exact description of the same, reference being had to the accompanying drawings, forming a part of this specification, and to the reference characters marked thereon.

The present invention relates to cutters for gears, wheels and analogous structures, and has particular reference to the production of what are known as curved or spiral teeth, and one object is the provision of a cutter which may be employed to produce curved or spiral toothed gears according to a hobbing system, involving a continuous indexing motion of the gear blank while the cutter is rotated and each blade or cutting member is presented to the blank in such a manner as to successively engage different teeth making a single cut upon a tooth during every complete rotation of the blank. Inasmuch as the blank and cutter are both continuously rotated by such relative movements as to effect complete cutting of the teeth, the machine may be said to operate on a hobbing principle, and a further purpose of the invention to construct a cutter of novel character with the blades arranged so as to permit clearance and prevent dragging the heel of the cutting portion during the passage through a tooth space, and also to provide other improvements as to the construction and arrangement of cutter blades in order to permit the necessary adjustments for lining up the blades with reference to the center of the support and to insure proper spacing between successive blades, and also their proper positioning on the cutter head to maintain a uniform depth of cut and effective pressure angle. To these and other ends the invention consists in certain improvements and combinations of parts, all as will be hereinafter more fully described, the novel features being pointed out in the claims at the end of the specification.

In the drawings:

Figure 1 is a sectional view of a cutter showing the application of the invention in a preferred embodiment;

Fig. 2 is a side elevation showing the cutting portion in end elevation;

Fig. 3 is a perspective view of one of the blades;

Fig. 4 is a side view of the same;

Fig. 5 is a diagrammatic view showing the relation of cutter and blank during the cutting operation on a gear;

Fig. 6 is a similar view in diagram illustrating the relation of cutter and blank in forming a gear to mesh with that shown in Fig. 5;

Similar reference characters throughout the several views indicate the same parts.

Figure 7:
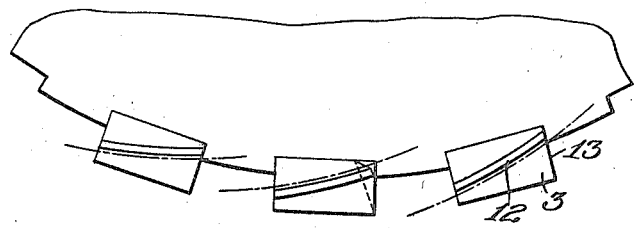
Fig. 7 is a partial plan view of the cutter.

The present application is a division of an application filed by us December 26, 1914, Serial No. 879,026, and is intended to cover the general form of cutter therein disclosed, which is applicable for the production of teeth, especially upon gears of the bevel type, and other work of a similar nature involving the production of slots or teeth that are curved continuously from end to end. In the art of gear cutting generally, it has been proposed to form teeth upon the arcs of spirals as well as upon the arcs of circles and it is a characteristic of the present improvement that the tooth produced as well as the cutting portion utilized in the cutting of the tooth, are formed upon the arc of a roulette resulting from a hobbing action of a series of blades equally spaced upon a cutter head and brought into cutting relation with the blank by rotating the head and at the same time imparting a continuous rotation to the blank so that the independent blades coöperate successively with different portions upon the blank. The cutting portion of each blade has the curvature of a roulette, with its back portion or heel offset with relation to the front or to the path of the cutting edge and the outer end and sides of the cutting portion are relieved, thus insuring complete clearance between the blank and cutting portion except as to the cutting edge of the latter. The blades may be formed for cutting either alternately upon opposite sides of teeth or all upon corresponding sides of different teeth, in either of which cases, the successive blades must be equally spaced from one another so that they may enter the blank at exactly the proper point during the continuous movement of the latter to coöperate properly with successive teeth. According to another modification of the invention the blades may be arranged in pairs, the cutting portions of each pair operating on adjacent sides of adjacent teeth at the same time, and being equally spaced from the corresponding cutting portions of the next adjacent pair.

In the construction shown in the drawings, which is intended merely as illustrative of a practical method of carrying out the invention, 1 designates a head or support adapted to be mounted upon a spindle or other rotating element and turned continuously during the cutting operation. The head 1 is provided in its periphery with a series of slots or openings 2 to receive the blades, each of which includes a base portion 3 and a cutting portion that will be more fully described presently. Each blade is held in position by a bolt 4 passing through an opening in the base portion 3 and engaging a threaded opening 5 in the head 1. Each blade is arranged for radial adjustment with reference to the head in order to bring the cutting edge closer to or farther away from the center of the head. To this end the base of the recess 2 is inclined with reference to the axis of the head as indicated by 6, and located between the inclined face 6 and the base portion 3 of the blade, is an adjusting or wedge member 7 which is movable transversely or axially of the head to effect radial adjustment of the blade. The wedge 7 is adjusted by means of a set screw 8 engaging a threaded opening in the head and having an enlargement 9 which coöperates with a recess or opening 10 in the wedge 7. The wedge 7 is also provided with a central opening 11 through which passes the bolt 4 and it will thus be seen that by loosening the bolt 4, any radial adjustment of the blade can be had by turning the set screw 8 after which the bolt 4 is tightened to maintain the blade in fixed relation on the cutter head. This adjustment enables the cutting edge of the blade to be properly positioned, with the outermost points of the several cutting edges all in a single plane perpendicular to the rotary axis of the head and also makes it possible to readily make the required change in the position of a blade as the cutting edge is ground away and new portions of the blade are presented to the work. By this means each blade can be used throughout very nearly the entire length of the cutting portion, and until the latter is worn to such an extent that there is not sufficient material remaining between the base and cutting portions to withstand the strain of the cutting operation.

Figure 8:
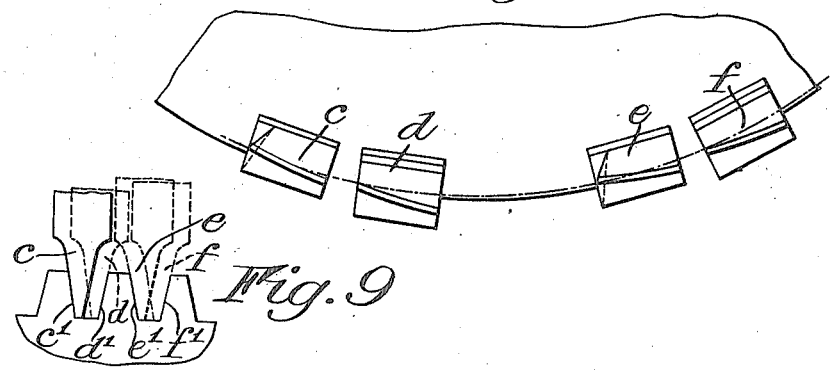
Fig. 8 is a similar view of a modified form of a cutter.
Figure 9:
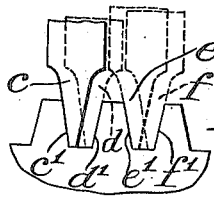
Fig. 9 is a detail view showing the cutting relation of blank and cutter of the form illustrated in Fig. 7.
Figure 10:
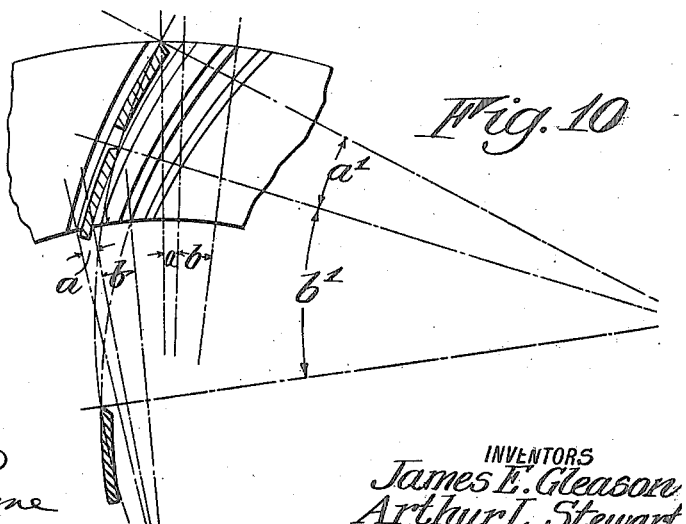
Fig. 10 is a diagrammatic view in plan showing the cutting relation of the blank and cutter disclosed in Fig. 7.

Each cutting portion includes an outer end 12, front wall 13 and back wall 14. The front wall 13 is preferably sheared off at an angle affording a cutting edge 15 that engages the side of a tooth during the cutting operation. The body of the cutting portion, that is to say, the outer end 12 and the sides, are curved substantially upon the arc of a roulette, and the back portion or heel of the cutting portion is offset with reference to the front or to the path of the cutting edge, in order to afford proper clearance in passing through a tooth space, the outer end and sides being relieved toward the back to fully insure such clearance, and any section through the cutting portion in a plane radially of the cutter axis has a trapezoidal form, of the same contour as any other radial section. According to the forms disclosed in Figs. 5, 6 and 7 the cutting portions of alternate blades have their cutting edges on the inside while on the remaining blades the cutting edges are on the outside, and with this arrangement for each setting of a blank only the alternate blades perform a cutting operation, the remaining ones being inactive and passing through a tooth space without engaging the work. In the arrangement shown in Fig. 5 the cutting portions marked $x$ make a cut each time they pass through the blank, while those marked $y$ are inoperative. After the teeth are completed on one side, the blank is reset, and the cutting portions $y$ operate on the opposite sides of the teeth, while the cutting portions $x$ are inactive. Fig. 5 shows a diagramamtic arrangement for cutting a gear, while a reverse arrangement is shown in Fig. 6 for cutting a pinion, and in Figs. 8, 9 and 10 there is illustrated a further modification where the blades are arranged in pairs, the cutting portions of each pair being adapted to pass through a tooth space successively and cut on the adjacent sides of adjacent teeth. Thus the cutting portions $c$ and $d$ cut on the sides $c'$ and $d'$, while the cutting portions $e$ and $f$, constituting the next pair on the cutter head, cut the sides $e'$ and $f'$ of the teeth forming the next tooth space. With this arrangement of blades, the distance between successive pairs is a constant one and the distance between the cutting edges of each pair is constant. The distance between the cutting edges of each pair of blades is in the same ratio to the distance between the last cutting edge of the pair and the initial cutting edge of the next pair, as the width of the base of a tooth space at one edge bears to the distance from the base of one tooth space to the base of the next adjacent tooth space. That is to say, referring to Figs. 9 and 10, $a'$ bears the same ratio to $b'$ as $a$ does to $b$.

While we have shown and described a more or less specific form of cutter, it is to be understood that the invention is not confined to the structure set forth, and the application is intended to cover any modifications within the scope of the appended claims characterized by a cutting portion of roulette curvature, for producing a curved tooth by continuous rotation of cutter and blank, as well as the general type of cutter blade adjusting means described.

We claim as our invention:

1. A gear cutter comprising a head or support adapted to be rotated and a blade secured thereto having a cutting portion curved from front to back and adjustable radially of the head.

2. A gear cutter comprising a head or support adapted to be rotated and a blade secured thereto having a cutting portion curved on the arc of a roulette from front to back.

3. A gear cutter comprising a head or support adapted to be rotated and a blade secured thereto having a cutting portion curved on the arc of a roulette from front to back and adjustable radially of the head.

4. A gear cutter blade having a cutting portion formed on the arc of a roulette.

5. A gear cutter comprising a head for support adapted to be rotated and having a slot or opening in its periphery, a blade having a base portion engaging said recess and an adjustable member arranged between the blade and the head and adjustable transversely of the head for effecting radial adjustment of the blade.

6. A gear cutter comprising a head or support adapted to be rotated and having a slot or opening in its periphery, a blade having a base portion engaging said recess and a cutting portion curved from front to back, and an adjusting member arranged between the blade and the head and adjustable transversely of the head for effecting radial adjustment of the blade.

7. A gear cutter comprising a head or support adapted to be rotated and having a slot or opening in its periphery, a blade having a base portion engaging said recess and a cutting portion curved on the arc of a roulette from front to back, and an adjusting member arranged between the blade and the head and adjustable transversely of the head for effecting radial adjustment of the blade.

8. A gear cutter blade including a cutting portion curved from front to back and having its back part offset with reference to the path of the cutting edge to afford clearance in passing through a tooth space.

9. A gear cutter blade including a cutting portion curved from front to back on the arc of a roulette and having its back part offset with reference to the path of the cutting edge to afford clearance in passing through a tooth space.

10. A bevel gear cutter consisting of a head or support adapted to be rotated and a plurality of blades secured thereto and having cutting portions extending beyond the adjacent side face of the head in the direction of its axis and spaced for successive engagement with different teeth on a blank.

11. A gear cutter consisting of a head or support adapted to be rotated and a plurality of blades secured thereto and having cutting portions extending beyond the adjacent side face of the head in the direction of its axis, and spaced for successive engagement with different teeth on a blank, each cutting portion being curved from front to back.

12. A gear cutter consisting of a head or support adapted to be rotated and a plurality of blades secured thereto having cutting portions extending beyond the adjacent side face of the head in the direction of its axis and spaced for successive engagement with different teeth on a blank, each cutting portion being curved from front to back on the arc of a roulette.

13. A gear cutter consisting of a head or support adapted to be rotated and a plurality of blades secured thereto and having cutting portions extending beyond the adjacent side face of the head in the direction of its axis and spaced for successive engagement with different teeth on the blank, each cutting portion being curved from front to back and offset toward its back with reference to the path of the cutting edge to afford clearance in passing through a tooth space.

14. A gear cutter consisting of a head or support adapted to be rotated and a plurality of blades secured thereto and having cutting portions extending beyond the adjacent side face of the head in the direction of its axis and spaced for successive engagement with different teeth on a blank, each cutting portion being curved from front to back on the arc of a roulette and offset toward its back with reference to the path of the cutting edge to afford clearance in passing through a tooth space.

15. A bevel gear cutter consisting of a head or support adapted to be rotated, and a plurality of independent blades secured thereto and having cutting portions formed and adapted to successively engage different teeth on a blank.

16. A gear cutter consisting of a head or support adapted to be rotated, and a plurality of independent blades secured thereto and arranged in pairs, the pairs of blades being equally spaced and each pair adapted to cut on the adjacent faces of two adjacent teeth forming one tooth space, while each successive pair of blades is adapted to pass through different tooth spaces.

17. A gear cutter consisting of a head or support adapted to be rotated, and a plurality of independent blades arranged circularly of the center of the head, the blades having cutting portions offset from front to back with reference to the path of the cutting edge, and adapted to successively engage different teeth on a blank.

JAMES E. GLEASON.
ARTHUR L. STEWART.

Witnesses:
A. G. VAYO,
E. W. BULLOCK.